Sept. 20, 1955 T. COLLINS 2,718,289
NAILABLE STRUCTURAL MEMBER
Original Filed Feb. 3, 1950
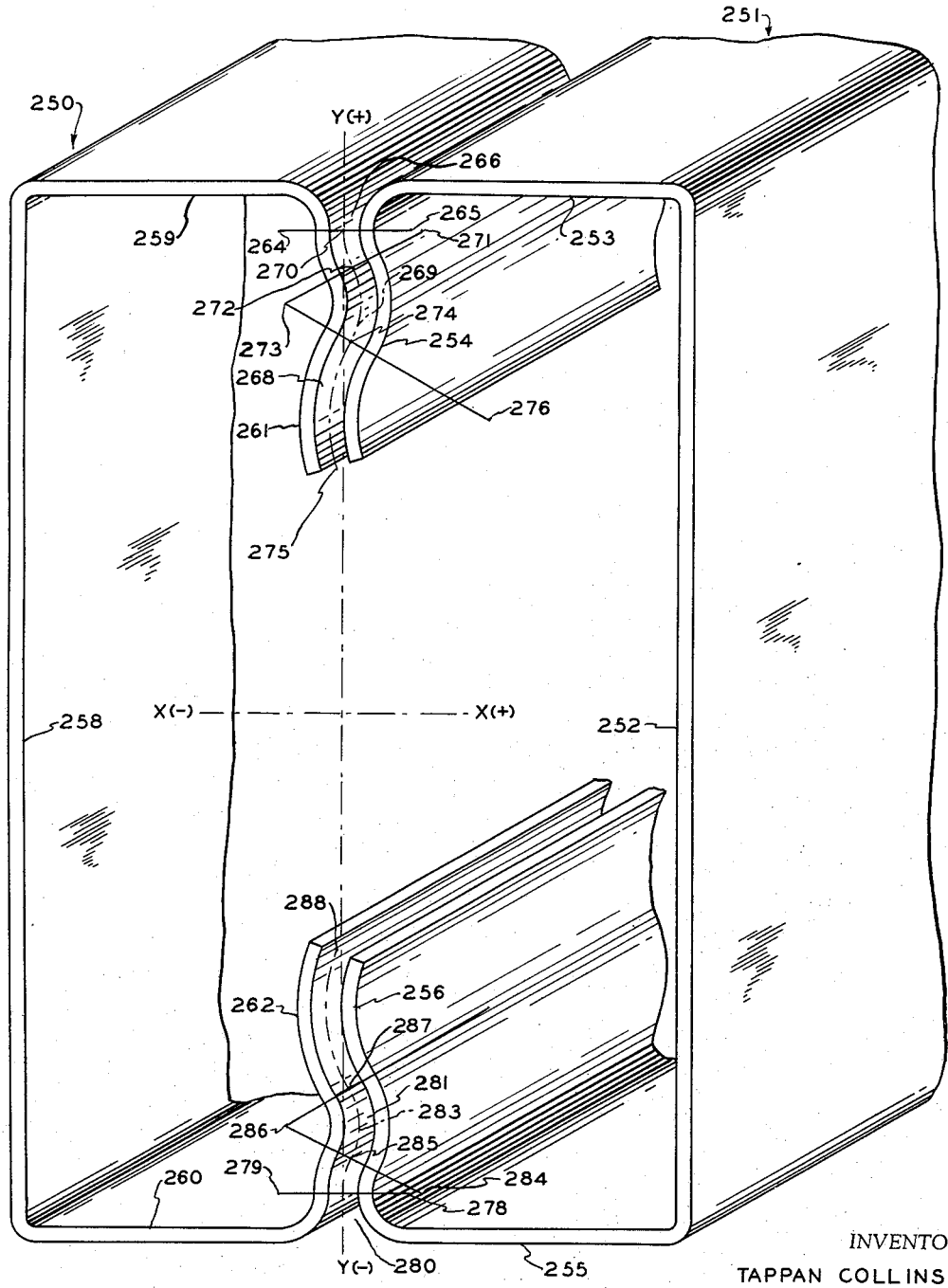
INVENTOR
TAPPAN COLLINS
BY
ATTORNEY

United States Patent Office 2,718,289
Patented Sept. 20, 1955

2,718,289

NAILABLE STRUCTURAL MEMBER

Tappan Collins, Grosse Pointe Woods, Mich., assignor to National Steel Corporation, a corporation of Delaware Original application February 3, 1950, Serial No. 142,171, now Patent No. 2,685,354, dated August 3, 1954. Divided and this application May 6, 1954, Serial No. 428,016

4 Claims. (Cl. 189—34)

The present invention relates to structural members and more particularly to nailable structural members formed of metal, such as steel sheet or strip, and adapted to receive and removably retain nails, whereby boards or other collateral material may be attached to the structural members by means of nails and similar fastening elements.

This application is a division of copending application Serial No. 142,171, filed February 3, 1950, for Nailable Structural Members, now Patent No. 2,685,354.

It is an object of my invention to provide a nailable structural member that will securely retain nails and that will securely retain a nail subjected to a live load.

Another object of my invention is to provide an improved nailable structural member that will not be deformed by nails driven into the member.

Another object of my invention is to provide an improved nailable structural member formed of relatively thinner metal that is relatively stronger and more rigid than the nailable members heretofore provided.

Various types of metal nailable structural members have been proposed in the past. These nailable members have been intended to replace wooden members and have been intended to receive and retain driven nails while permitting the removal of the nails when desirable. Only a few of the proposed types have been accepted for commercial use. The nailable members which have received commercial acceptance have, in general, been of the type in which a nail is driven into a tortuous or sinuous slot or groove defined by parallel spaced apart webs. These webs are provided with a single corrugation so that the nail is bent first in one direction and then back in the opposite direction through a single reverse curve. These structural members are designed to be used with a nail having a diameter substantially equal to the width of the slot. It has been considered by designers that the nail is held in place by friction and by resistance of the nail to straightening. While nailable members of this particular type have received fairly wide acceptance for commercial use as beams, joists, columns, studs and the like, the members do have a number of drawbacks or deficiencies. One serious trouble encountered in using such a member is that while the nailable member may retain the nail against a constant withdrawal force applied in one direction, the nail is readily worked loose by a live load. For example, when the head of the nail is gripped and an attempt is made to pry the nail out of the groove by means of a suitable instrument, it may be found that it is quite difficult to withdraw the nail in this manner, and it has been considered that the nailable member will satisfactorily retain nails during use. A difficulty arises when the head portion of the nail is subjected to a weaving, bending, lunging load—that is, a live load—for the nail is "walked" out of engagement with the structural member. Each cycle of change in load application will pull the nail a short distance out of the nailing groove. Under nearly all conditions of commercial application, the nail is subjected to live load at least part of the time, and if the cycles are relatively rapid or if the live load is relatively great, the nail is quickly worked out of the nailing groove. Accordingly, the nailable members of the prior art have been characterized by relatively weak nail retaining qualities, especially when the nail is subjected to a live load.

Another difficulty encountered with nailable structural members is the tendency of the nails to deform the walls of the nail receiving and bending slot. If the walls are materially deformed or spread, the ability of the member to retain nails is either lost or greatly reduced. To overcome or reduce this tendency, it has been the practice quite frequently to make the member of relatively thicker metal. This in turn increases the problems involved in forming the nailable member and increases the cost of the member. This is particularly undesirable as the users of such members are often quite cost conscious, particularly where the structural member is being substituted for a wooden member. In many instances, the nailable member is made heavier than is necessary to support the loads applied to the member when in use so that the nail will not deform the member. In other words, the thickness of the metal in a structural member, such as a beam, is determined by the forces set up by the driven nail and not by the load carrying capacity required of the beam.

In accordance with the present invention, the nail receiving and bending means of the nailable, metal structural member is constructed and arranged in a novel manner so that the nail is securely held in place when subjected to a live load and not readily "walked out" of the nail receiving slot. It has been discovered that bending or corrugating the webs which define therebetween the nail holding slot, so that the slot extends through two reverse curves, greatly increases the retention of nails, particularly nails subjected to live loads. The addition of the second reverse curve increases the retention of nails more than the increase in the length of the nail receiving slot, if there is any increase in the length of the slot. The reason why a nail receiving means which bends a nail through two reverse curves will retain a nail subjected to a live load while a nail receiving means which bends a nail through a single reverse curve will not retain a nail subjected to a live load is not accounted for by merely multiplying the properties of a single reverse curve by the factor, two. In addition, and as will be more fully hereinafter described, the addition of more reverse curves or corrugations does not correspondingly increase the resistance of the nail to withdrawal by a live load.

Further, it has been found that the structural member can be constructed of thinner metal without having the nail spread or deform the walls or webs defining the nail receiving slot, if the second reverse curve is made larger than the first so that the nail is bent more gradually. In other words, for each unit of longitudinal advance, the nail is bent through fewer degrees when being driven through the second reverse curve than when being driven through the first reverse curve.

An unexpected advantage of the present invention has been in the discovery that the presence of the second relatively larger reverse curve enables the cross-sectional area to be proportioned so that the nailable structural members are now free or substantially free of any tendency to twist under loads tending to bend the members. Insofar as is known, the prior art nailable structural members and particularly those which have received commercial acceptance have been characterized by poor structural stability. When these members have been used as beams, joists, columns, studs, or other frame members, it has been necessary to brace the members quite extensively to prevent twisting or to use larger members, or both.

These and other objects and advantages will become apparent when considering the following description, taken with the accompanying drawing, the single figure of which is a cabinet view of a structural member embodying the principles of the present invention.

Referring to the single figure of the drawing which illustrates a box-type nailable structural member embodying the principles of the present invention, the structural member comprises a pair of C-shaped channel members 250 and 251 fastened together face-to-face. The channel member 251 comprises a flat web portion 252 having integrally joined thereto along one edge an L-shaped flange including a flange portion 253 and a flange or web portion 254. Similarly, an L-shaped flange is integrally joined to the opposite edge of web 252 and comprises a flange portion 255 and a flange portion 256. The C-shaped member 250 includes a flat web portion 258, flange portions 259 and 260 integrally joined to opposite edges of the web portion 258 and inwardly directed flange portions 261 and 262 integrally joined to flange portions 259 and 260, respectively. The flange portions 253 and 259 are coplanar and extend equally and oppositely outwardly from axis y—y. The pair of flange portions 255 and 260 are coplanar and extend equally and oppositely outwardly from axis y—y. The pair of flange portions 253 and 259 are symmetrical about axis y—y as are the pair of flanges 255 and 260. The flat web portions 252 and 258 are symmetrical about axis y—y and axis x—x is midway between the outer surfaces of the two pairs of coplanar flange portions.

The metal at the juncture of flange portions 259 and 261 is curved about a center 264 and the metal at the juncture of flange portions 253 and 254 is curved about center 265 to define a nail entering throat 266 that is symmetrical about axis y—y. The flange or web portion 261 together with the flange or nail guiding portion 254 defines therebetween a tortuous nail receiving slot 268 extending inwardly from throat 266 and constitutes a nail receiving and bending means. The flange portions 254 and 261 are curved so that axis 269 of the nail receiving slot 268 first curves from point 270 on axis y—y to one side or to the right of axis y—y through an arc of short radius about center 271 to point 272. The axis 269 next curves from point 272 away from and then back toward axis y—y through an arc of relatively shorter radius about center 273 to point 274. Thereafter, axis 269 extends through an arc from point 274 toward and across axis y—y and then away from axis y—y to the opposite or left side of axis y—y and finally back toward axis y—y to point 275 and this last mentioned arc has a relatively longer radius of curvature about center 276.

Thus, the nail bending means adjacent the flange portions 253 and 259 contains two reverse bends and is adapted to bend a nail through two reverse curves with the second reverse curve larger than the first.

The metal at the juncture of portions 255 and 256 is curved about a center 278 and the metal at the juncture of portions 260 and 262 is curved about center 279 to define an entering throat 280 symmetrical about axis y—y. The flange or web portions 256 and 262, together, define therebetween a tortuous nail receiving slot 281 extending inwardly from throat 280. The portions 262 and 256 are symmetrical with respect to portions 254 and 261 about axis x—x. The portions 262 and 256 are parallel and curved so that axis 283 of slot 281 curves to one side or the right of axis y—y through a first arc of short radius about center 284 to point 285 and then further away from axis y—y and then back toward axis y—y through a second arc of short radius about center 286 to point 287. Thereafter, axis 281 extends through a third arc of longer radius from point 287 toward and across axis y—y and then away from and back toward axis y—y to point 288. The radius of the second arc is as long as or longer than the radius of the first arc but is shorter than the radius of the third arc. Thus, the curved portions 256 and 262 constitute nail bending means for bending a driven nail through two reverse curves with the second reverse curve longer than the first.

The two C-shaped members 250 and 251 may be fastened together at spaced points along their lengths by any suitable means, such as the means shown in Figures 1 and 3 of the copending application Serial No. 142,171, filed February 3, 1950 for Nailable Structural Members.

Each of the nail bending means bends a driven nail through two reverse curves so that the nail driven into either slot 268 or 281 is securely held against withdrawal by a live load as the inner surfaces hold or engage the nail at four points as distinguished from a single reverse curve which only holds the nail at two points. These points will be more clear if consideration is given to the condition which would exist if a nail slightly smaller than the slot were used. Additional curves would be redundant insofar as increasing the ability of the nail bending means to retain nails subjected to live loads.

The addition of the second relatively larger reverse curve enables the two nail bending means to be arranged so axes y—y and x—x are principal gravity axes for these two means taken together. If only one bending means is considered, these axes are not principal gravity axes for the one means. That portion of the cross-sectional area of the structural member which is exclusive of the two nail bending means is symmetrical about axis y—y so that axis y—y is a principal gravity axis for this portion of the area and axis x—x is necessarily parallel to the outer surfaces of the two pairs of coplanar flange portions. In addition, axis x—x is a principal gravity axis for this portion of the area. As previously described, axes y—y and x—x are also principal gravity axes for the area of the two nail bending means. Therefore, if the member is arranged in a framework as, for example, a beam and loaded uniformly on the flanges, the member will not tend to twist.

When the structural member is used in a framework as a beam, column stud, joist or other member, there will be a load against the side or sides of the member. Preferably, and in addition, axis x—x is therefore midway between the outer surfaces of the two pairs of coplanar flange portions so that such lateral loads will not tend to twist the member. Accordingly, the structural member shown in the drawing has maximum stability against twisting and lateral bracing can be eliminated or greatly reduced. As shown, axis x—x is the major axis as the greatest stiffness is desired about this axis but axis y—y could be the major axis. In most cases, it will be desirable for axis x—x to be the major axis, particularly when the member is used as a beam, but under some conditions it may be desirable to have axis y—y the major axis. If the width of the member were increased sufficiently relative to the height, axis y—y would be the major axis instead of the minor axis.

In the structural member described in detail, axes y—y and x—x are coordinate axes located in a plane normal to the length of the elongated member. The cross-sectional area A of the member may be divided into two parts—the first part or portion being the area of the metal exclusive of the two nail bending means. This portion of the area will hereinafter be referred to as area B. The second portion of the cross-sectional area is the area of the metal of the two nail bending means. This portion of the area will hereinafter be referred to as area C. Now considering more particularly area B, it is believed clear that the area B is symmetrical about axis y—y so that axis y—y is a principal gravity axis for area B. In addition, if the area B is symmetrical about axis y—y, the two pairs of coplanar flange portions are located in planes normal to axis y—y or, in other words, axis x—x is parallel to the outer surfaces of the two pairs of coplanar flanges. It is also believed clear that axis x—x is a principal gravity axis for area B.

In each of the nail bending means and starting at the outer end of the nail receiving slot, the axis of the slot curves from a point tangent to axis y—y away from and to one side of axis y—y through a first arc about a center located on the one side of the axis y—y. The axis of the nail receiving slot then curves further away from axis y—y and then back toward but not to axis y—y through a second arc about a center located on the opposite side of axis y—y. The axis of the nail receiving slot then curves to and across axis y—y and then away from and thereafter back toward axis y—y through a third arc about a center located on the one side of axis y—y. The three radii just mentioned are so proportioned that the two nail bending means together are arranged such that axes x—x and y—y are principal gravity axes for the two nail bending means. These axes are not principal gravity axes for only one of the nail bending means. In fact, axis y—y is not a principal axis for one of the nail bending means but is only a principal axis for the two nail bending means.

Thus, for area C, the addition of the third relatively larger curve to each of the nail bending means enables the nail bending means to be arranged so that axes x—x and y—y are principal gravity axes for the two nail bending means. It is only by the addition of the second relatively larger reverse curve that it is possible to have axes x—x and y—y principal gravity axes for area C. If this relatively larger curve were eliminated, it would be impossible to arrange the nail bending means in such a manner that axes x—x and y—y would be principal gravity axes.

As axes x—x and y—y are principal gravity axes for area C and area B, axes x—x and y—y are principal gravity axes for the entire area A, and the following relations are established: $\int y dA = 0$, $\int x dA = 0$, and $\int xy dA = 0$, in which y corresponds to the one axis, x corresponds to the other axis and A corresponds to the cross-sectional area of the nailable member. Area B is symmetrical about axis y—y with axis x—x parallel to the outer surfaces of the two pairs of coplanar flange portions and, thus, the structural member will have greatly increased stability and will not tend to twist when uniformly loaded along the outer surface of either pair of coplanar flange portions. In addition, the structural member is shown with axis x—x midway between the outer surfaces of the two pairs of coplanar flange portions so that the structural member also has lateral stability. A load uniformly applied against either side of the structural member will not cause twisting and lateral bracing can be greatly reduced or eliminated. As structural members which are used as beams in a framework are usually subjected to some lateral loads, it is preferable that the principal gravity axis x—x be midway between the outer surfaces of the two pairs of coplanar flange portions so that the beam will not have to be extensively braced.

I claim:

1. An elongated, box-like sheet metal nailable structural member comprising a pair of channel members arranged face-to-face and presenting a first pair of flange portions having coplanar outer surfaces and a second pair of flange portions having coplanar outer surfaces, the flange portions of each pair of flange portions being perpendicular to and oppositely disposed with respect to one axis of a pair of mutually perpendicular intersecting axes and the first and second pair of flange portions being parallel to and oppositely disposed with respect to the other axis of the pair of axes, an integral web extending from the outer lateral edge of one flange portion of the first pair of flange portions to the outer lateral edge of one flange portion of the second pair of flange portions, an integral web extending from the outer lateral edge of the other flange portion of the first pair of flange portions to the outer lateral edge of the other flange portion of the second pair of flange portions, a nail receiving slot defining means adjacent each pair of flange portions for receiving and bending a driven nail, each slot defining means including a first flange member joined to one flange portion of the corresponding pair of flange portions and a second flange member joined to the other flange portion of the same pair of flange portions, the portions of the flange portions and the flange members at the juncture of the flange members with the respective pair of flange portions defining a nail entry throat symmetrical about the one axis, each pair of flange members of the slot defining means being spaced apart to define therebetween an elongated nail receiving slot extending inwardly from the entry throat, each pair of flange members of the slot defining means including curved portions curved so that the center line of the slot starting at a point tangent to the one axis extends inwardly and curvilinearly first to one side of and away from the one axis through a first arc and then farther away from and then toward the one axis through a second arc and thereafter across and away from and then back toward the one axis through a third arc of relatively longer radius than the radius of the second arc whereby a nail driven through an entry throat and into the respective nail receiving slot is bent through two reverse curves by the curved portions of the first and second flange members, the axes being principal gravity axes for the area of cross-section of the nailable member exclusive of the curved portions of the flange members, the relative proportionment of the cross-sectional area of the curved portions of the flange members establishing the relations $\int y dA = 0$, $\int x dA = 0$, and $\int xy dA = 0$, in which y corresponds to the one axis, x corresponds to the other axis and A corresponds to the cross-sectional area of the nailable member, whereby the axes are principal gravity axes for the nailable member.

2. A nailable structural member as defined in claim 1 in which the second axis is midway between the outer surfaces of the first and second pair of flange portions.

3. A nailable structural member as defined in claim 1 in which the second axis is midway between the outer surfaces of the first and second pair of flange portions and is the major axis of the area of cross-section of the structural member.

4. A nailable structural member as defined in claim 1 in which the area of cross section of the member is symmetrical about the second axis and in which the second axis is the major axis of the area of cross section of the member.

No references cited.